Nov. 18, 1947.                G. BITZER                    2,431,160
         WELT TURNING MECHANISM AND METHOD OF TURNING WELTS
                  Filed Sept. 1, 1943        10 Sheets-Sheet 1

INVENTOR
Gottlob Bitzer
BY
ATTORNEY

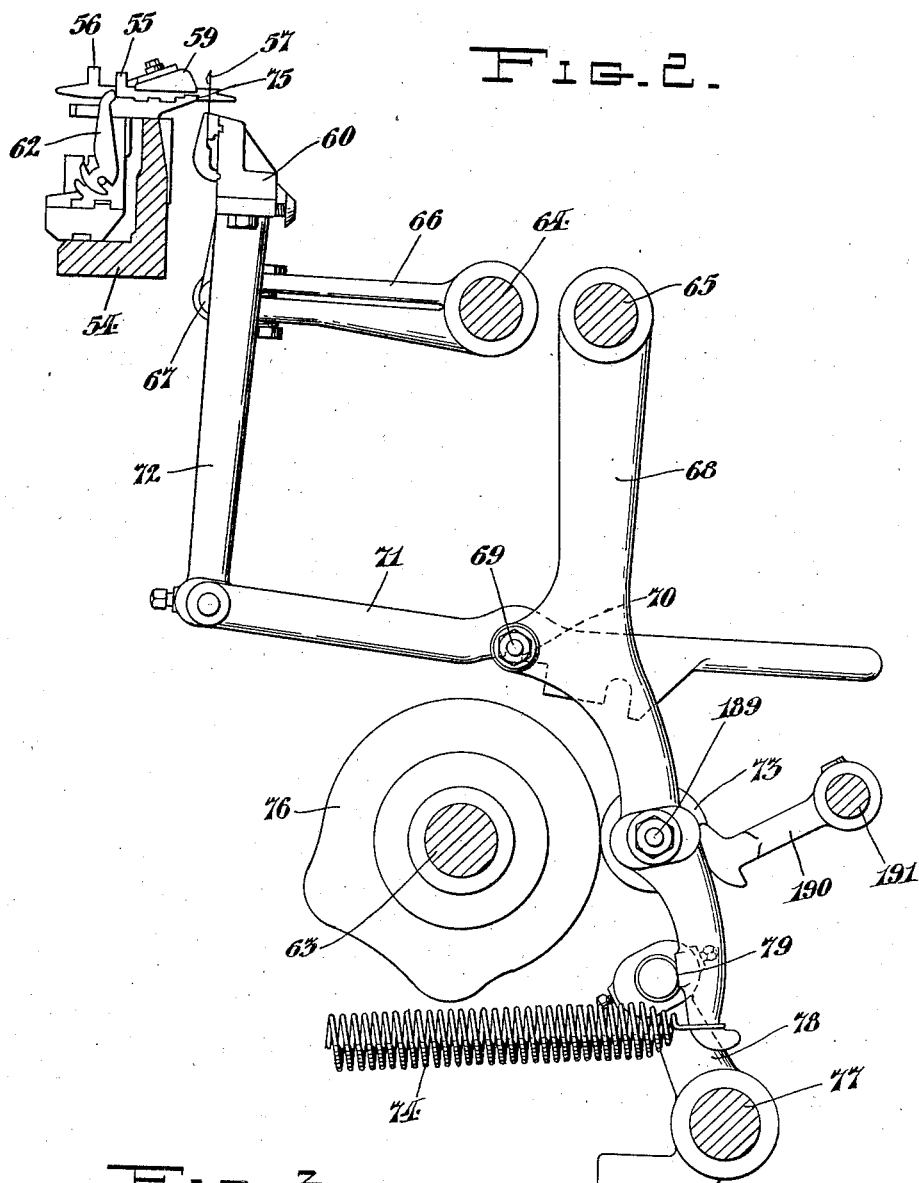
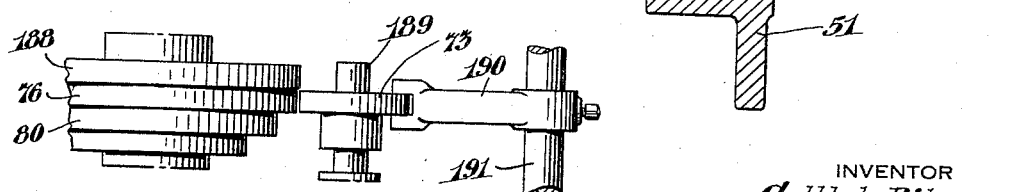

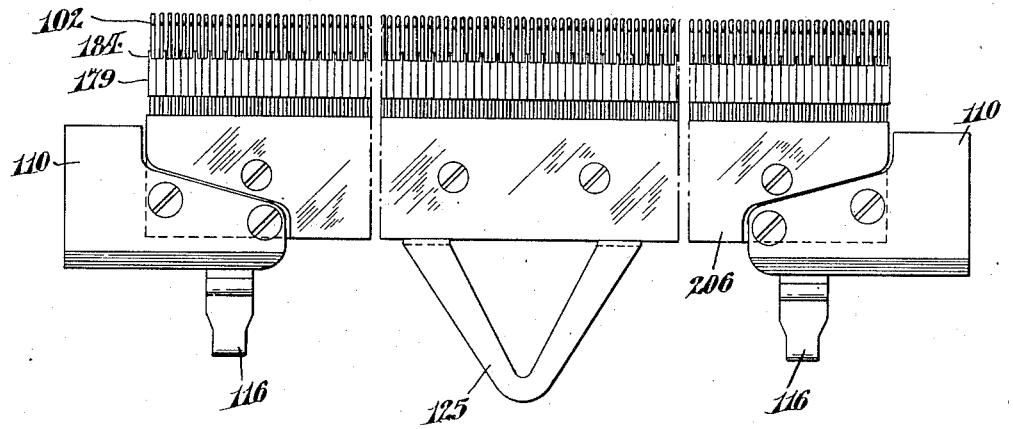
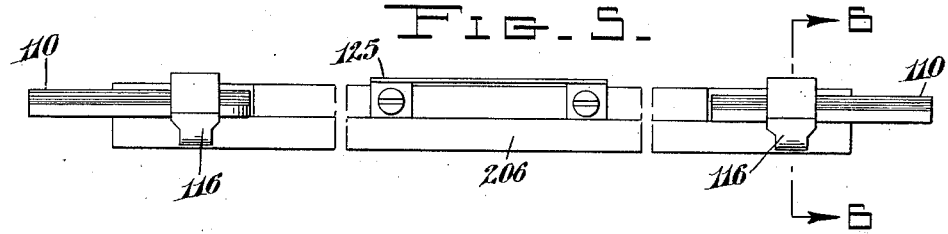
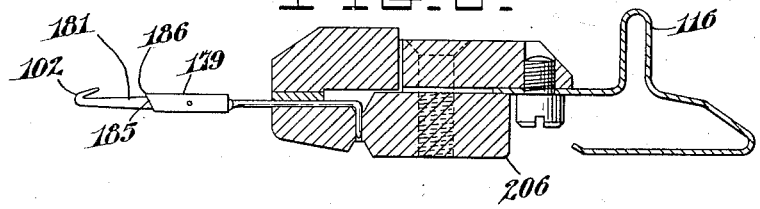
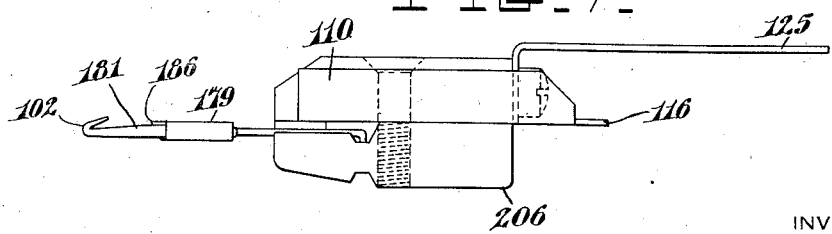
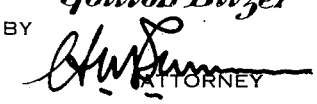

Nov. 18, 1947.  G. BITZER  2,431,160
WELT TURNING MECHANISM AND METHOD OF TURNING WELTS
Filed Sept. 1, 1943  10 Sheets-Sheet 4
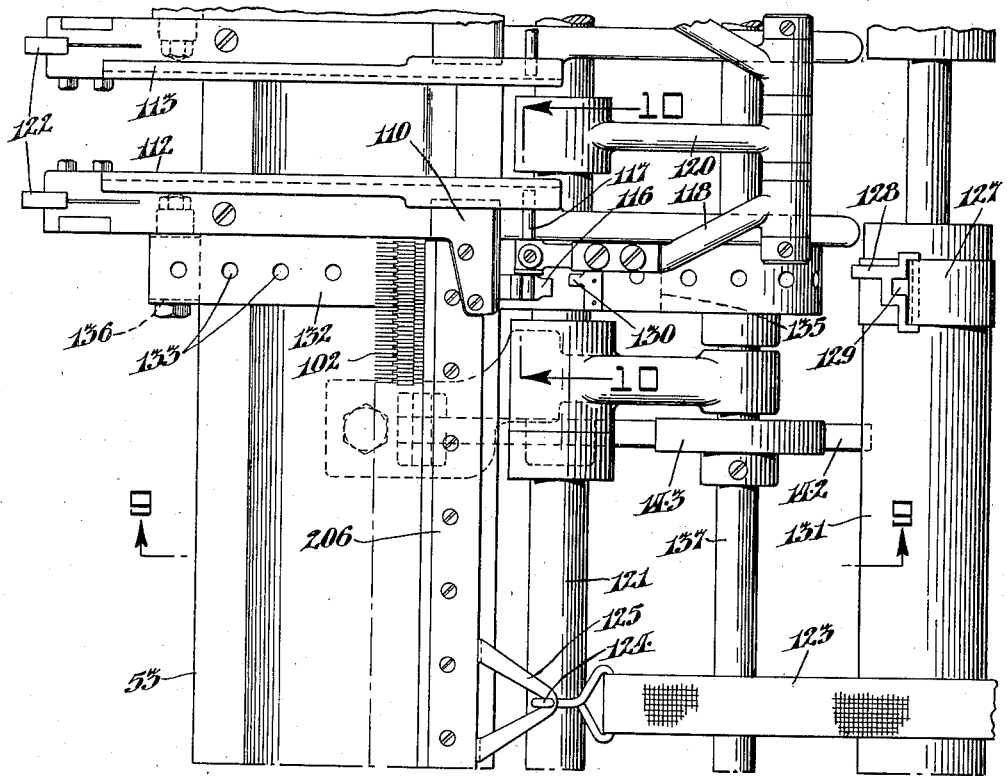
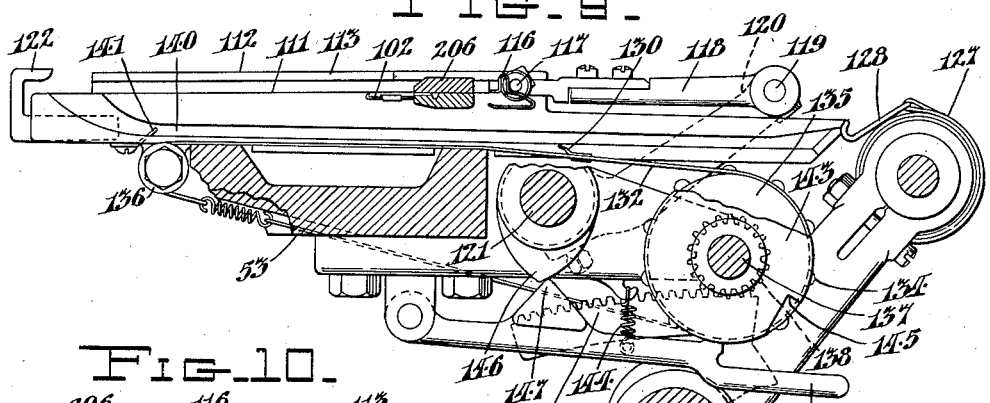
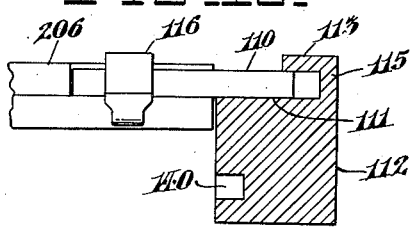
INVENTOR
Gottlob Bitzer
BY
ATTORNEY Nov. 18, 1947.  G. BITZER  2,431,160
WELT TURNING MECHANISM AND METHOD OF TURNING WELTS
Filed Sept. 1, 1943  10 Sheets-Sheet 5

INVENTOR
Gottlob Bitzer
BY
ATTORNEY

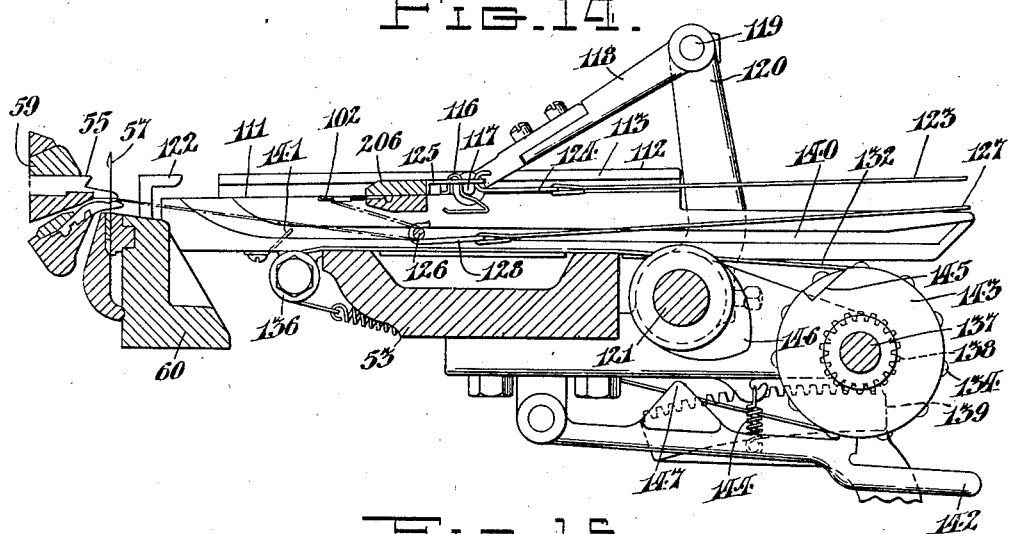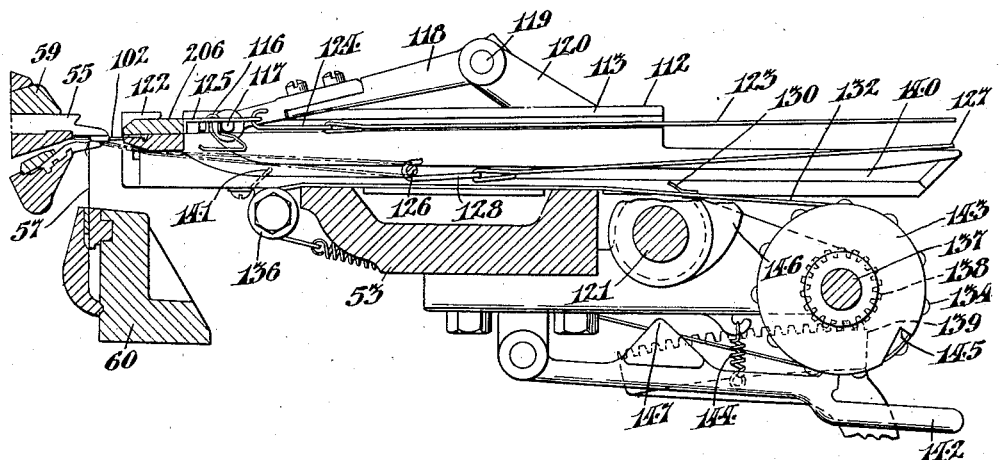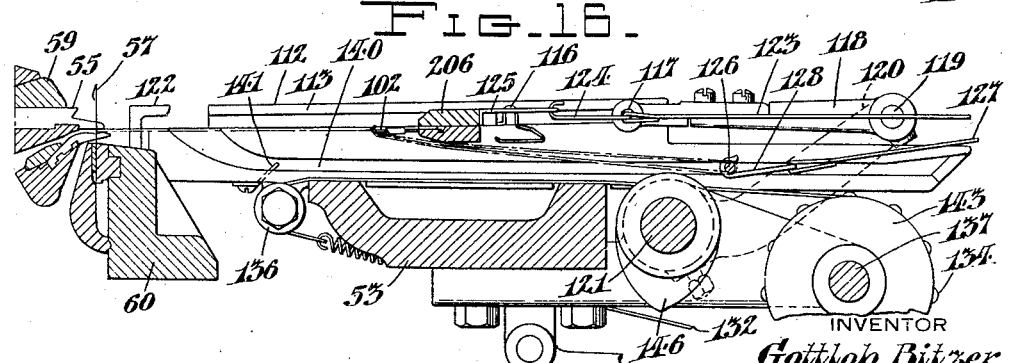

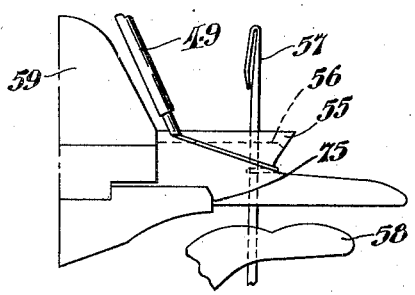
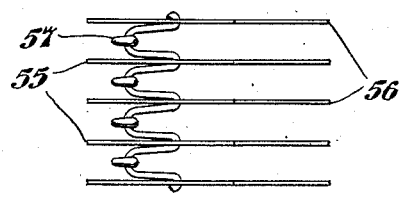
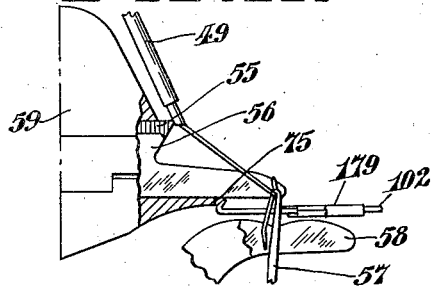
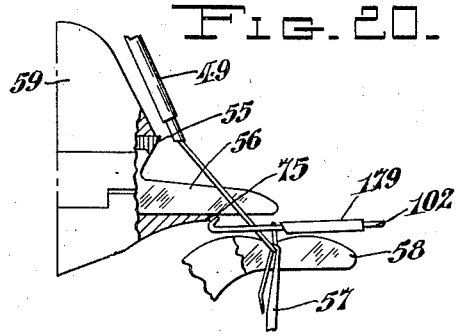
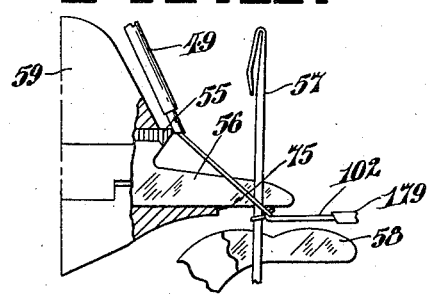
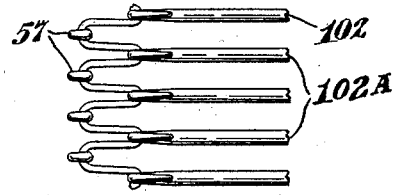
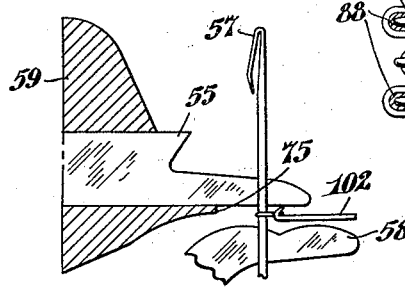
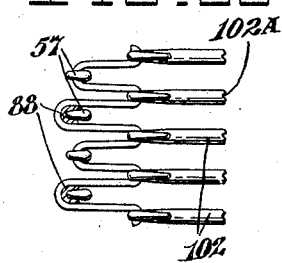
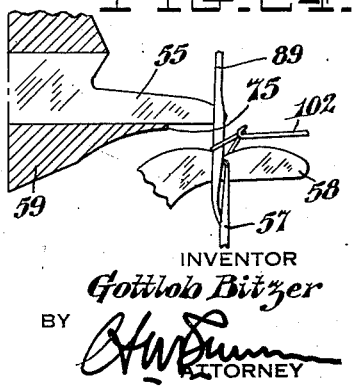

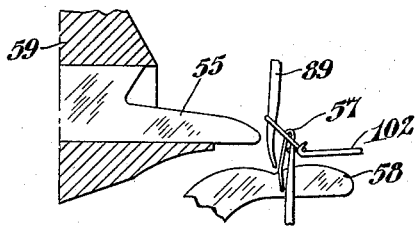
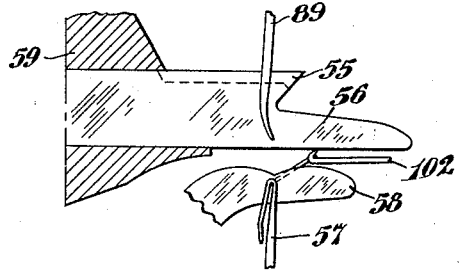
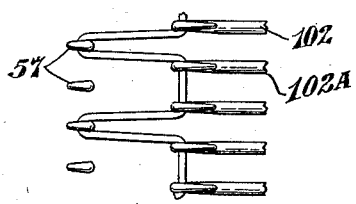
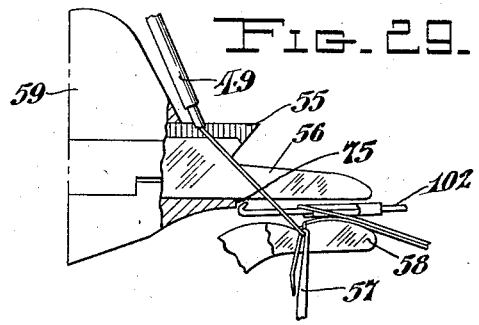
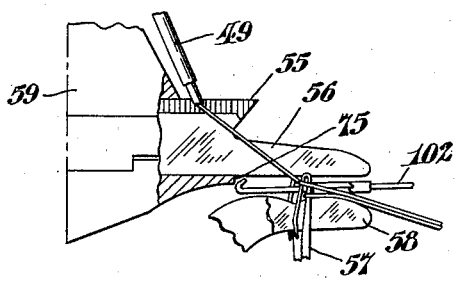
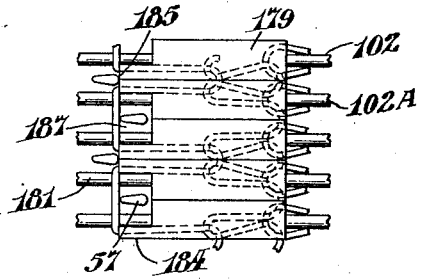
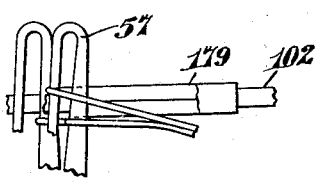
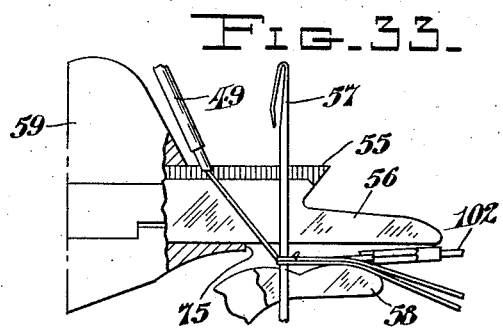
INVENTOR
Gottlob Bitzer
BY
ATTORNEY

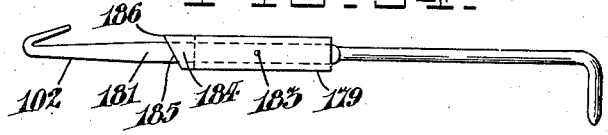
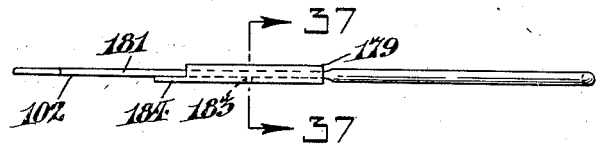
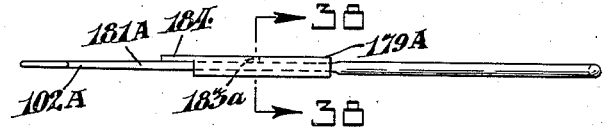
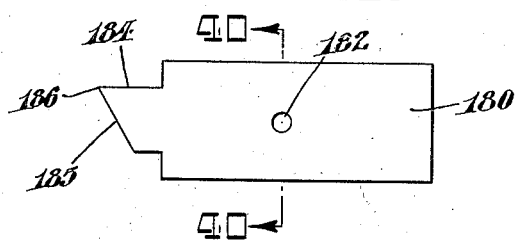
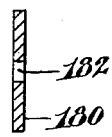

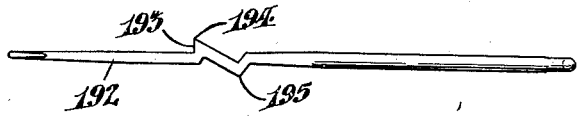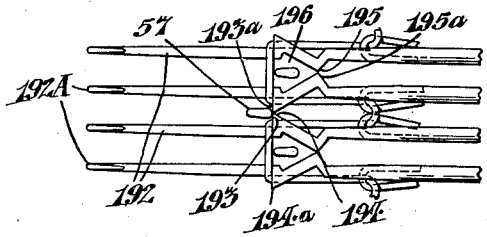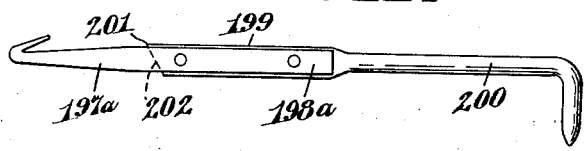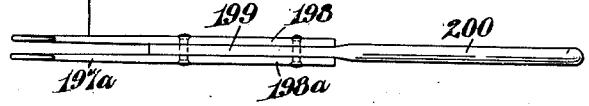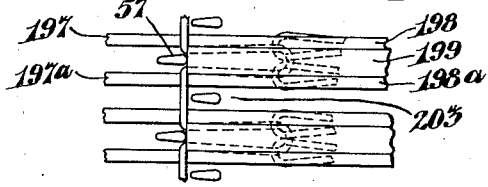

Patented Nov. 18, 1947

2,431,160

UNITED STATES PATENT OFFICE 2,431,160

WELT TURNING MECHANISM AND METHOD OF TURNING WELTS

Gottlob Bitzer, Lincoln Park, Pa., assignor to Textile Machine Works, Wyomissing, Pa., a corporation of Pennsylvania Application September 1, 1943, Serial No. 501,037

29 Claims. (Cl. 66—96)

This invention relates to turning the welt portion of a fabric on a full-fashioned or like knitting machine and to certain improved adjuncts for use in such an operation. In certain aspects this invention is an improvement over that disclosed and claimed in my prior application filed June 10, 1941, Serial No. 397,452, now Patent No. 2,413,601, for Automatically performing welting operations.

As is well known, the first course of loops in a fabric formed on a full-fashioned or other flat knitting machine is commonly "hooked up"; that is caught on a set of hooks, welt hooks held in a welt bar, and drawn away from the needles for a time during the formation of a number of subsequent courses. The fabric knitted while the first course of loops is held on the welt hooks is ordinarily turned to form a two-ply welt and to lock the loops of the first course by returning such loops of the first course onto the needles and thereafter knitting the returned loops into the fabric. This operation of forming a two-ply welt in full-fashioned hosiery is of general practice, and the so called turning step, that is the transfer of the first course of loops which are held upon the welt hooks back onto the needles, has customarily been done by hand.

While a number of apparatuses and methods have been proposed for turning welts formed on full-fashioned knitting machines, some have been technically successful insofar as restoring the first course to the needles was concerned, but all have left something to be desired as to simplicity and cost. Those which have been complicated have been expensive and often cumbersome while their complication necessitated a long period of training for the operators in order to obtain substantially trouble free operation and limited the number of operators capable of handling the apparatus satisfactorily. The less complicated forms of welt turners have generally suffered from unreliability in the turning operation. By far the greater part of the knitted welts now being produced are still turned by hand.

It is an object of this invention to provide an improved welt turning mechanism of either a fully automatic or of a semi-automatic character adapted for use on full-fashioned and like knitting machines and which will increase the reliability of operation in proportion to the complexity and/or cost of the apparatus.

Another object of my invention is to provide a novel welt turning apparatus requiring a relatively small number of parts and arranged to press the needles or certain of them at the time of restoring the first course to the needle row and which will produce the desired pressing action by a relatively light pressure, decrease the needle breakage and have a minimum tendency for the parts to fall out of the necessary time relationship.

A further object is to provide a welt bar having a group of welt hooks thereon as well as means closely associated with said hooks for pressing certain of the needles out of their normal positions at the time of restoring loops of the first course to the needles.

An additional object is to provide a welt hook having a presser portion thereon.

A still further object is to provide combined welt hook, loop pusher and needle presser means in a knitting machine.

With these and other objects in view, which will become apparent from the following detailed description of the illustrative embodiment of the invention shown in the accompanying drawings, my invention resides in the novel methods, elements, features of construction and arrangement of parts in cooperative relationship as hereinafter more particularly pointed out in the claims.

In the drawings:

Fig. 2 is a sectional detail view showing parts of the mechanism for controlling the needles;

Fig. 3 is a detail view in plan of the presser cams for the knitting cycle, for the usual narrowing cycle and for the cycle for restoring the first course to the needles;

Fig. 4 is a plan view of the central and end portions of a welt bar fitted with welt hooks having presser means associated therewith;

Fig. 5 is an elevation of the forward side of the bar shown in Fig. 4;

Fig. 6 is a section taken substantially on the line 6—6 of Fig. 5, looking in the direction of the arrows;

Fig. 7 is an end view, looking from the left of Fig. 5, a part being broken off;

Fig. 8 is a plan view on an enlarged scale of mechanism for moving a welt bar for engaging a first course of loops, knitting a welt and turning a welt;

Fig. 9 is a sectional view taken substantially on the line 9—9 of Fig. 8;

Fig. 10 is a sectional detail taken substantially on the line 10—10 of Fig. 8, looking in the direction of the arrows, certain parts being omitted;

Figure 1:
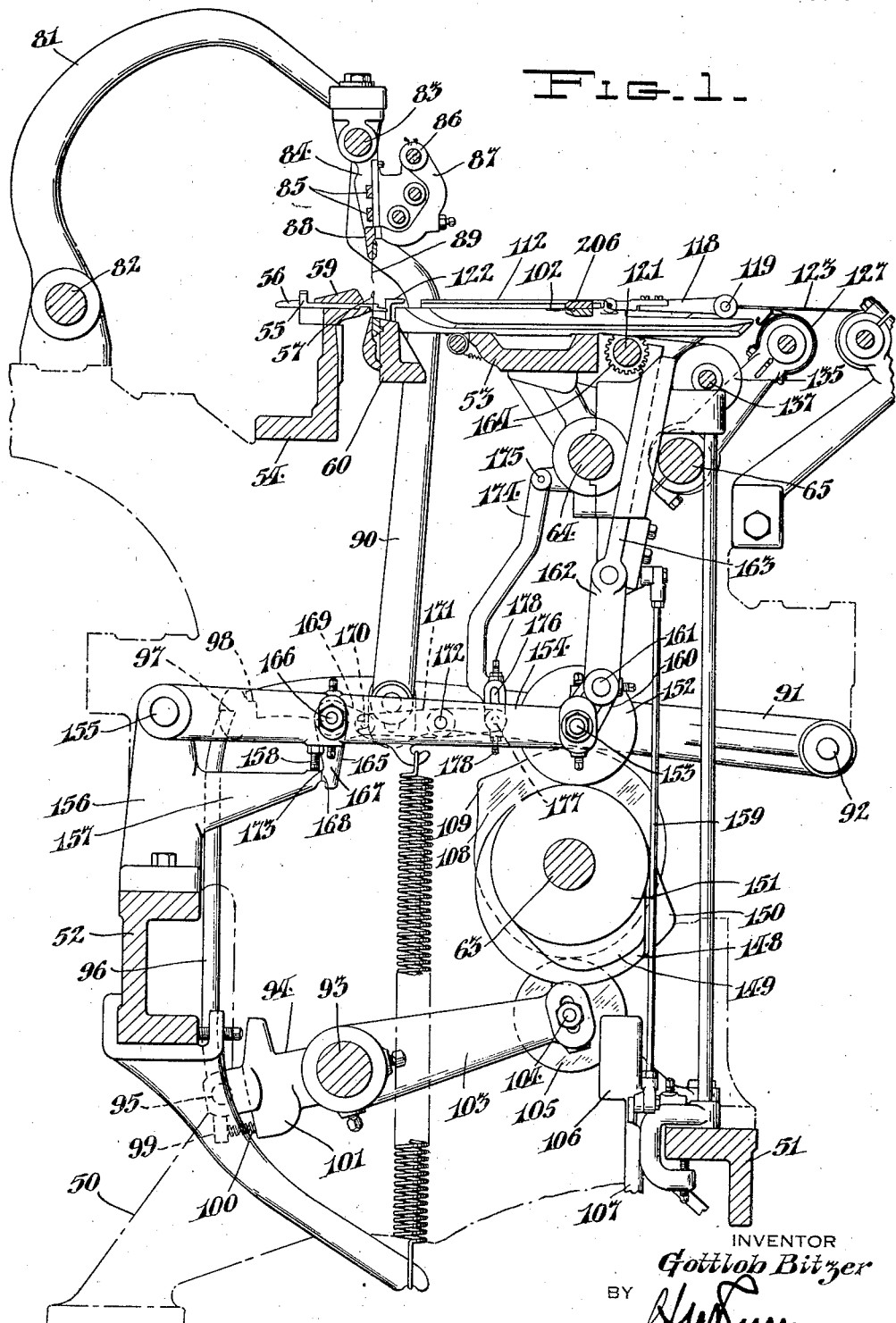
Figure 1 is a cross-sectional view at a point intermediate the length of a full-fashioned knitting machine, parts being omitted for purposes of illustration.
Figure 11:
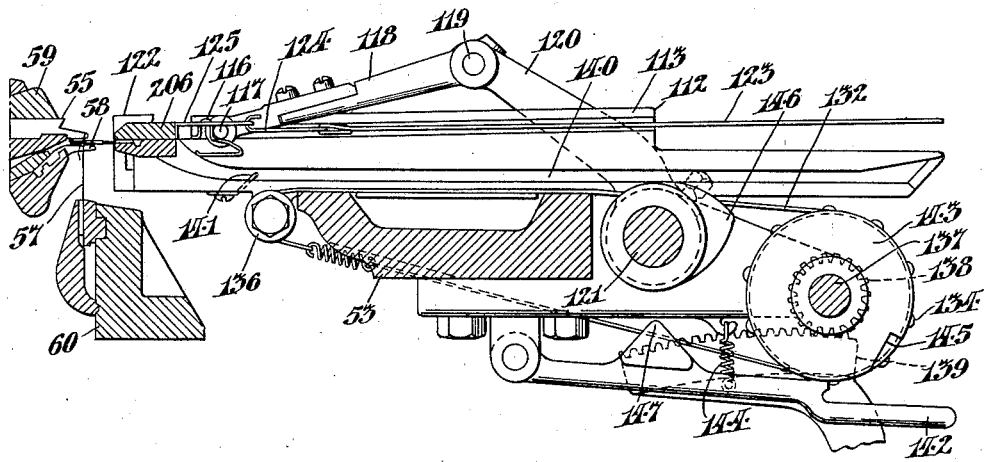

Figs. 11 to 16 inclusive are sectional views similar to Fig. 9 showing the parts in different successive positions occupied after the one shown in Figs. 8 and 9 in carrying out a hooking-up and welt turning cycle;

Fig. 17 is a side view showing the sinkers, needles and yarn guide just after the yarn for the first course of a welt has been laid to the needles;

Fig. 18 is a detail plan view showing some of the needles and sinkers in the same position as in Fig. 17;

Figs. 19, 20 and 21 are views showing successive positions of the sinkers, needles and welt hooks in hooking up the loops of the first course;

Fig. 22 is a plan view showing some of the needles and welt hooks in the same position as in Fig. 21;

Fig. 23 is a vertical sectional view showing a needle, sinker, welt hook and casting-off point at the beginning of a cycle for casting off alternate loops of the first course;

Fig. 24 is a view similar to Fig. 23 but showing the parts in a succeeding position;

Fig. 25 is sectional plan view showing certain needles, points and welt hooks in the same position as in Fig. 24;

Figs. 26 and 27 are views similar to Fig. 24 but showing the parts in succeeding positions in a casting-off cycle;

Fig. 28 is a plan view of some of the needles and welt hooks after alternate loops of the first course have been cast off the needles as in Fig. 27;

Fig. 29 is an end view partly broken away showing the positions of the needles, welt hooks and presser means as the needles begin their upward movement to catch the previously cast-off loops of the first course held on the welt hooks;

Fig. 30 is a view similar to Fig. 29 but showing the needles in a slightly higher position than in Fig. 29, some of the needles being pressed out of their normal line;

Fig. 31 is a plan showing some of the needles, welt hooks and associated presser means in the same position as in Fig. 30;

Fig. 32 is a detail side view on an enlarged scale of two of the needles and welt hooks shown in Fig. 30;

Fig. 33 is a view similar to Fig. 30 but showing the needles after they have passed up through the loops on the welt hooks and the hooks have moved forward as far as permitted at the time by fabric;

Fig. 34 is an elevation of the preferred form of welt hook and associated presser means according to the invention;

Fig. 35 is a plan of the hook and presser means shown in Fig. 34;

Fig. 36 is a plan of a hook and presser means similar to Fig. 35 except that the presser means is on the side of hook opposite to that shown in Fig. 35;

Fig. 37 is a section on the line 37—37 on Fig. 35, looking in the direction of the arrows;

Fig. 38 is a section on the line 38—38 on Fig. 36 looking in the direction of the arrows;

Fig. 39 is an elevation of a metal blank of a form utilized to form the presser means on the hooks shown in Figs. 35 and 36;

Fig. 40 is a section taken on the line 40—40 of Fig. 39;

Fig. 41 is an elevation of another form of combined welt hook and presser means within the invention;

Fig. 42 is a plan of the hook and presser means shown in Fig. 41;

Fig. 43 is a plan of a hook and presser means similar to the one shown in Fig. 42 except that the presser means is on the side of the hook opposite to that in Fig. 42;

Fig. 44 is a plan of several left and right hook and presser means like those of Figs. 42 and 43 assembled alternately left and right and showing needles and loops in the relative positions in which the needles rise through the loops on the hooks;

Fig. 45 is an elevation of still another form of combined welt hook and presser means in accordance with the invention and in which two hook members are mounted on a single shank;

Fig. 46 is a plan of the hook and presser means shown in Fig. 45; and

Fig. 47 is a detail in plan of parts of several combined hook and presser means as shown in Figs. 45 and 46 together with loops of a first course of a welt thereon and showing needles in the positions assumed as they rise between the hooks to take loops from the hooks.

In the drawings and description, only the means and method necessary to a complete understanding of the invention have been specifically set forth; further information as to the construction and operation of other related, usual and well known knitting machine elements, mechanisms, etc., may be found in one or more of the following publications:

1. Pamphlet entitled—Full Fashioned Knitting Machines—published and copyrighted by the Textile Machine Works, Reading, Pennsylvania, in 1920.

2. Three catalogs entitled—The "Reading" Full-Fashioned Knitting Machine Parts Catalog—published and copyrighted by the Textile Machine Works, in 1929, 1935 and 1940 respectively.

3. Booklet entitled—The "Reading" High-Production Full-Fashioned Knitting Machine—which forms a supplement to the above noted 1940 parts catalog of the Textile Machine Works, and which booklet is a publication of the Textile Machine Works, and was copyrighted by the latter in 1940.

4. Pamphlet entitled—Knitting Machine Lectures—published by the Wyomissing Polytechnic Institute, Wyomissing, Pennsylvania, in 1935.

The knitting machine shown in part in the drawings is a standard "Reading" legger or single unit machine except as modified to include certain of the improvements in welt turning apparatus disclosed in my said application Serial No. 397,452, certain features of the welt turner disclosed in said prior application being, however, omitted herein.

In the welt turning apparatus disclosed herein, means are provided whereby the loops of the first course are "hooked up" or caught on welt hooks in a welt bar so as to be drawn away from the needle row as usual during the knitting of certain subsequent courses included in the welt. When a predetermined length of the welt fabric has been knitted, the welt rod is placed upon the fabric, the welt bar is thrust part way toward the needles and tension is applied to the welt rod to form a fold in and to tension the welt fabric. When all the courses of the welt are completed the welt bar is given a further movement toward the needles into a position to restore the loops of the first course to the needles to complete the turning of the welt. Such method of operating to knit and turn the welt, together with means for performing the same, is disclosed and claimed in my said prior application, Ser. No. 397,452, and while disclosed also herein forms no part of the present invention and is not claimed herein.

In accordance with the present invention, means moving with the welt bar are utilized to press alternate needles in the direction contrary to the draw-off motion to prevent them from engaging loops intended to be received on the remaining needles, said remaining needles being allowed to maintain their usual position relative to the needle bar and being inserted in the loops held on the stems of the welt hooks. Preferably, the needles to receive loops are tilted a bit more in the direction of the draw-off motion at the time the loops are restored to the needles than is the case at the time the needles rise through the loops in knitting an ordinary course. So pressing the needles which are not to receive loops ensures that they will miss the edges of the loops and so avoid damage to the yarn and irregularity in the fabric. Using both the extra tilt of one group and the pressing of the other group of needles provides a maximum reliability of operation to ensure that all of the loops will be transferred from the hooks back to the needles and without damage to the yarn or to the appearance of the fabric due to action of the needles intended to be idle.

There is provided in accordance with the present invention a welt bar having novel presser means thereon and novel hook-up members including or carrying the presser means whereby the needles to be pressed may be contacted at the level of the hook-up members; in other words, at as high a level as practical to produce the desired degree of pressing with a minimum of lateral pressure and danger of needle breakage. An improved presser cam is provided to give the needle bar the unusual degree of tilt desired while the needles are rising.

Referring to the drawings more in detail, the full-fashioned "Reading" knitting machine partially shown in Fig. 1 therein comprises a framework including transverse frames 50 shown in dot and dash lines on which are longitudinal frame members such as the front beam 51, the back beam 52, the front bed or table 53 and the center bed 54. Such machines commonly have a number of knitting sections which are substantially duplicates, so that only one section is shown. Further, the cams for carrying out certain functions are commonly supplied in multiple, although not at the rate of one per section, but only one cam for carrying out a given function is shown. Therefore, any description of one cam herein and accompanying parts for carrying out a given function will be understood as applying to a plurality of similar cams. The elements entering most directly into the knitting of the yarn are yarn carriers 49 (Fig. 17), sinkers 55, dividers 56, beard-type needles 57, and knockover bits 58. The sinkers and dividers are mounted as shown to reciprocate in sinker-heads 59 mounted on the center bed 54 while the needles 57 are mounted on needle bars such as 60 which are caused to follow a path involving up and down as well as back and forth motions. The forward movements of the sinkers are caused by slur cams (not shown) which are reciprocated so as to swing forward at desired times the upper ends of jacks 62 which act to push the sinkers from the position shown in Fig. 1 to that shown in Fig. 2. The slur cams are actuated to follow closely the movements of the yarn carriers which are reciprocated by the same cam, a coulier cam (not shown), as the slur cams. The coulier cam reciprocates a slur bar or connecting bar (not shown), to which the slur cams are connected, and a friction box rod, said bar and rod moving in synchronism. On the friction box rod are friction boxes adapted to be connected, one to any desired yarn carrier rod, each rod having a carrier thereon for each knitting section. The throw of each yarn carrier rod is, however, limited by stops one at each end of its path, so that the throw of the yarn carriers is less than that of the slur cams, the friction boxes slipping on the friction-box rod after the yarn carrier rod hits a stop. As the yarn carriers move, the yarn guide tubes at their lower ends lay yarn on the noses of the sinkers and dividers. Almost as soon as the guide tube has passed a given sinker, the sinker is pushed forward by the slur cam and jack to push the yarn between two adjacent needles, thereby measuring off the yarn needed for two loops. The dividers then are moved forward by the catch-bars (not shown) so that the yarn is divided evenly between all the needles. The catch-bars afterward draw both the sinkers and dividers back again to facilitate drawing the loops off the noses of the sinkers and dividers by the needles. The catch-bars also thrust the sinkers and dividers forward a second time during a given cycle, to hold the fabric below the sinkers and dividers, and draw them back again to be ready for couliering at the beginning of the next knitting cycle.

The needle bars 60 receive their motions from cams on the main cam shaft 63, on which are also the cams for carrying out motions of the remaining active parts of the machine. As shown, the needle bars 60 are operated from two shafts, a needle bar shaft 64 and a presser shaft 65. The needle bar shaft has substantially horizontal arms 66, two for each needle bar, which extend rearwardly beneath the needle bars and have pivots 67 at their rear ends in which are pivoted short generally vertical arms, the upper ends of which are fixed to the needle bars. Cams (not shown), some for the knitting cycle and some for the narrowing cycle, oscillate the needle bar shaft 64 to produce the motions of the bars 60 and needles 57 in the direction at right angles to the sinkers, the up and down direction in the present day full-fashioned knitters.

The forward and rearward or back and forth motions of the needles and needle bars, those parallel to the sinkers, are caused by presser cams, of which a group of three are shown in Fig. 3. The presser shaft 65 has depending levers or arms 68 fixed thereon for receiving impulses from said presser cams. Means for transmitting impulses from said cams to the needles include pins 69 fixed to arms 68 about midway of their lengths, pins 69 normally engaging in notches 70 in the lower edges of links 71 which extend both forwardly and rearwardly of the pins 69 and the rear ends of which are pivotally connected to the lower ends of arms or levers 72. The upper ends of arms 72 are fixed to the under sides of the needle bars. Each lever 68 has a cam follower 73 pivoted or journalled thereon for directly receiving the impulses delivered by one or the other of the presser cams. Each cam follower 73 is shiftable longitudinally of its pivot for a reason which will presently appear. Also each pivot for a cam follower 73 is shown as fixed to its lever 68 intermediate pin 69 and the lower end of the lever, near the latter there being a tension spring 74 connected thereto arranged to draw the lever rearwardly toward the shaft 63. During their downward motions in knitting cycles, the needles 57 are swung rearwardly so that their beards contact with presser edges 75 shown at the forward ends of the base members of the sinker heads to thereby force the tips or lower ends of the beards into grooves in the upper ends of the stems of the needles. Such rearward motions are caused by presser cams 76, of which there are a number on a given multi-section machine. Whenever cams 76 press cam followers 73 forwardly against the pull of springs 74, links 71 draw the lower ends of arms 72 forwardly. The needle bars 60 and needles 57, however, being above pivots 67, the thereby swung rearwardly toward the presser edges 75.

As appears in Fig. 2, the presser cam 76 has a circular contour for the major portion of its perimeter, the high spots on the cams acting to cause the pressing action as just mentioned. The arms 68 and the needles would, therefore, if no other means were provided maintain the needles 57 a fixed distance from the presser edge 75 during all periods of laying the yarn to the needles. However, it will be seen that, the throw of the sinkers being constant, the amount of thread drawn per sinker during the slurring period depends on the distance of the needle stems from the presser edge 75 of the sinker head base during the slurring of the sinkers. As it is desired to change the lengths of the knitted loops from time to time, the diameter of the circular portions of cams 76 is made so small that the loops formed would be larger than ordinarily desired, and additional means is provided to control the position of arms 68 and the distance of needles 57 from the presser edge 75 during the period of couliering or slurring of the sinkers and to thereby determine the length of the knitted loops. Said additional means comprises a regulating shaft 77 on which are fixed short arms or levers 78 having pins fixed near their outer ends projecting substantially parallel to the shaft 77 and contacting at the desired times with contact faces 79 on the rear sides of the lower portions of arms 68 to swing the arms forwardly or counter clockwise as shown in Fig. 2 to thereby swing the needles closer to the sinker head than they would be held by cams 76 and to thereby determine or regulate the length of the loops. A special set of regulator cams (not shown) is provided for controlling the angular position of shaft 77 during yarn laying to thereby regulate the length of loops in the manner just described.

The full-fashioned knitting machine carries out two different cycles, one the knitting cycle just described and the other the "narrowing" cycle.

During a narrowing cycle, the cam shaft 63 is shifted to the right as viewed from the front of the machine thereby disconnecting the shaft of the coulier cam from the shaft 63 from which it is driven during knitting cycles. Therefore, no yarn is laid during a narrowing cycle. If then the needles 57 were to go to press during the narrowing cycles, the fabric would be cast off the needles during each such cycle. To prevent this, a cam 80 is provided alongside cam 76, shown at its left as viewed from the front of the machine, so that as cam shaft 63 shifts to the right at the beginning of the narrowing cycle, the cam follower 73 is automatically shifted from cam 76 to cam 80. Cam 80 will be understood to have no protuberance capable of throwing the needles against the presser edge.

During each narrowing cycle, the "narrowing machine" comes into play. Said machine comprises a series of curved arms 81 pivoted on a shaft 82 carried on the frame-work of the knitting machine and known as the back narrowing shaft. From shaft 82, arms 81 extend upwardly, forwardly and then somewhat downwardly. At their forward ends, they have fixed therein a shaft 83 known as the front narrowing shaft on which are fixed brackets 84 for carrying the narrowing rods 85, 85 employed in the operation of narrowing but which are not used in the welt area and therefore will be further referred to only incidentally. Also, supported from brackets 84 is, among other things, a shaft 86, pivotally mounted on which are arms such as 87 which, when in active position, curve downwardly and somewhat rearwardly as shown in Fig. 1 and are there fixed to a lace or picot bar 88 in which are held a series of points 89, commonly called picot points, of which there are half as many as there are needles. When not in use picot bars 88 may be turned counter clockwise from the position shown so that points 89 are at a level above the front narrowing shaft 83. Means is provided whereby the shaft 83 may be prevented from following certain of the usual narrowing dipping movements for purposes and in a manner hereinafter set forth. Such means comprises generally vertical links 90 which extend between front narrowing shaft 83 and levers 91, links 90 being pivoted at both ends. Levers 91 are generally horizontal and are pivoted in the frame at their front ends at 92. For raising levers 91 from and for lowering them to the position shown in Fig. 1, said means comprises a lifting shaft 93. Fixed on shaft 93 intermediate their ends are levers one of which appears at 94, Fig. 1. At its rear end, each lever 94 has pivoted thereto at 95 a lifting link or arm 96, each link 96 extending upwardly from its pivot 95 and having a sharp lip 97 adapted to engage a notch 98 in the under side each lever 91 and at the rear end thereof. At its lower end, each link 96 extends below its pivot as shown at 99, and a spring 100 between the extension 99 and an enlargement 101 of lever 94 thrusts link 96 in the clockwise direction about its pivot 95, as viewed in Fig. 1, so that lip 97 at the upper end of link 96 catches in notch 98 to lift lever 91 whenever lifting shaft 93 is turned clockwise much beyond the position in which it is shown in Fig. 1.

Bar 88 and points 89 derive their names from the fact that they are commonly used to make a "picot" course. In the present instance, I employ them also for casting off certain loops from the needles in a manner which will now be more fully explained.

When a narrowing cycle is to be performed, the cam shaft 63 is automatically shifted to the right from the knitting to the narrowing position thus bringing the cam followers on levers 91 onto narrowing cams for dipping the levers. At the same time, the movement of shaft 63 brings narrowing presser cams 80 into the planes of the followers 73 for the presser levers 68 both in the case of an ordinary narrowing cycle for narrowing the fabric by the action of combs on rods 85 and in the case of a casting off cycle.

Such a casting-off operation is employed on alternate loops of the first course of the welt to facilitate the restoration of the first course to the needles, the step of casting off for this purpose forming, however, no part of this invention. As previously indicated, after yarn has been laid to the needles for forming a first course of a welt, the yarn is sunk and divided to press the sinker loops between the stems of the needles as shown in Figs. 17 and 18. Welt hooks 102 and 102A are then thrust beneath the sinkers 55 and dividers 56 and above the knock-over bits 58 as shown in Figs. 19 and 20 to receive the sinker loops as they are drawn down off the noses of the sinkers and dividers by the needles when the sinkers and dividers are drawn back by the catch-bar. It will be understood that, in moving from the position shown in Fig. 17 to that shown in Fig. 20, the needles follow the path taken by them in the usual knitting cycle and it will be seen that, in so moving, the needles pass close to but are not affected by certain enlargements shown on the hooks while the welt hooks stand at the rearmost position occupied by them. The needles are, however, affected by said enlargements when the first course is returned to the needles because the needles are given an unusual or greater degree of forward tilt at such time, as hereinafter described. The draw-off tension is then applied to hooks 102, thereby producing the condition shown in Figs. 21 and 22. A narrowing cycle is then employed in which alternate loops of the first course are cast off the needles.

In such narrowing cycle, said narrowing dipping cams lower the levers 91 and front narrowing shaft 83 so that any points 89 in position to cooperate with the needles are brought down as the needles 57 start downward from the position shown in Fig. 23, but more rapidly, so that, the draw-off tension having been temporarily relaxed by automatic means for the purpose, the points press between the loops and the needles as shown in Figs. 24 and 25. In the ordinary narrowing cycle, the said narrowing cams retain control over the movements of the points until the loops affected by the points 89 or the like have been shifted to other needles, either by longitudinal movement of picot shaft 86 or longitudinal movement of narrowing rods 85.

For cases such as the present instance in which the loops affected by points 89 are to be cast off, however, control of the vertical motion of the points 89 is taken over at a certain point in the narrowing cycle by another means. For this purpose, the lifting levers 94 are provided with arms 103 which extend forwardly so that their forward ends lie beneath shaft 63 and they have fixed thereon pins 104 serving as pivots for cam followers 105. Cam followers 105 are mounted to be shifted on pins 104 parallel to the axis of shaft 63 by means of forks 106 at the upper ends of levers 107 and, at the proper time, the patterning means of the machine moves levers 107 to shift followers 105 into the planes of casting off cams 108. Cams 108 have high points 109 which are so set angularly that they force followers 105 downward and arms 96 upwards to lift the points 89 faster than is done by the dipping narrowing cams. The result is that, after the narrowing cams have lowered the points 89 from the position shown in Fig. 23 to that shown in Fig. 24 to engage alternate loops and the needles and points have then been raised by the dipping cams to the position shown in Fig. 26, the points instead of following the needles down again to the position shown in Fig. 27 are then raised by the high point 109 on cam 108 so that, the sinkers and dividers having been again brought forward as shown in Fig. 27 and lying above the fabric, the loops are then stripped off the points 89 just before the points and needles reach the relative positions shown in Fig. 27. The tension having been automatically thrown on again, the loops dropped by the points 89 are pulled by the draw-off tension above the tips of the needles to the non-beard sides thereof, thus completing the casting-off operation and bringing the loops into the position shown in Figs. 27 and 28 in which each cast-off loop embraces the stems of a pair of hooks. This action of the draw-off tension is facilitated by presser cam 80 for the narrowing cycle in drawing the needles sharply in the direction of the presser edge 75 at this time by means of the second protuberance on this cam without however causing them to touch the presser edge.

For the purpose of moving the welt bars and the hooks thereon into the positions desired for hooking up the loops of the first courses and for restoring the first courses to the needles, there is shown herein a mechanism similar to that disclosed and claimed in my said prior application, Serial No. 397,452. This mechanism also forms no part of my present invention and is not claimed herein. The welt bars 206, as shown in Figs. 4, 5, 6 and 7, are provided with projections 110 at their ends. Projections 110 slide on shoulders 111 on rails 112 which extend in pairs across the top of the centre bed at right angles to the needle rows, projections 110 extending beneath lips 113 at the upper edges of low thin walls 115 along the outer sides of rails 112, at least for parts of the paths of the bars along the rails. The representative welt bar 206 shown has fixed horizontally therein along its rear edge a series of special welt hooks 102 which have presser means directly associated therewith in accordance with the present invention. On its front edge, welt bar 206 has a pair of thin metal strips for receiving thrusts to move the bar toward the needles, one of which strips is shown at 116. Strips 116 are arranged to be contacted by pins 117 and are bent to form inverted U's against which the pins 117 thrust to move the bar toward the needle row. Pins 117 are mounted at the rear ends of links 118 and extend from points in alinement with strips 116 parallel to the centre bed 53 and perpendicular to rails 112 across shoulders 111 to points underneath the lips 113. The pins 117 therefore are held on the rails in their movements therealong. For operating pins 117, links 118 are pivoted at 119 to the upper ends of levers 120, the lower ends of which are fixed to a shaft 121. By turning shaft 121 counterclockwise as viewed in Fig. 9, levers 120 are turned so that pins 117 are carried toward the needle row, pushing bars 206 and welt hooks 102 before them. The first movement of shaft 121 pushes bars 206 up into the position shown in Fig. 11 in which they are in contact with stops 122.

Figure 12:
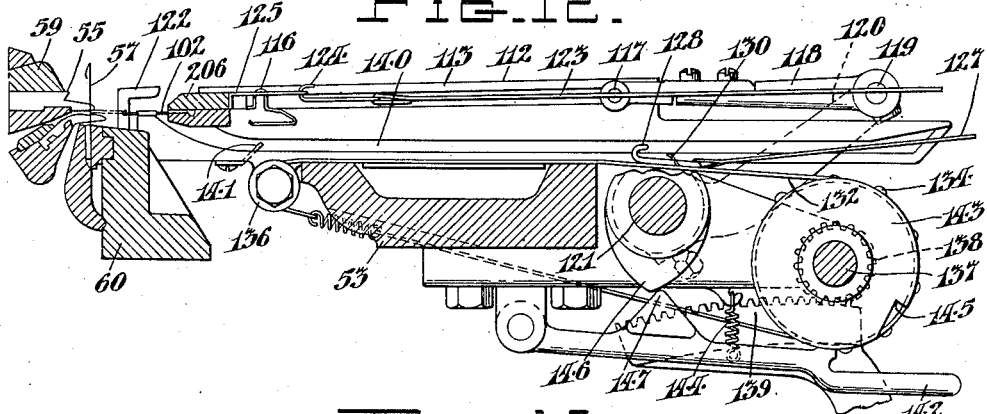

The welt hooks 102 having been engaged with the loops of the first course and the pusher pins 117 moved back again to the position shown in Figs. 1, 8 and 9, alternate loops are cast off as hereinabove described and the draw-off tension is applied to the bars 206 through weight operated straps 123 which have hooks 124 at their rear ends for engaging yokes 125 on the front edges of bars 206. Knitting then proceeds while preparations are made to apply a welt rod 126 (Fig. 13) to each welt fabric. As the draw-off tension is applied to the fabric blanks thru the ends of welt rods 126 as soon as practical and then for the remainder of the period of knitting a given set of blanks, such preparation preferably includes drawing toward the needle rows the straps 127 by which draw-off tension is to be applied to the welt rods by means of hooks 128 (Figs. 8 and 13) secured to the ends of straps 127. For this purpose, the hooks 128 are provided with apertures 129 (Fig. 8) whereby the hooks can be passed onto and engaged with fingers 130 (Fig. 9) as shown in Fig. 12, the drums 131 on which straps 127 are wound during knitting being turned counterclockwise from the position shown in Fig. 9 to permit hooks 128 to be drawn rearwardly for this purpose. Fingers 130 are fixed on belts 132 which are apertured at 133 (Fig. 8) to receive nobs 134 (Figs. 8 and 11 to 16 inclusive) on narrow drums 135 around which belts run at the forward ends of their paths. Belts 132 run around idler pulleys 136 at the rear ends of their paths, the upper runs of the belts passing above the center bed 53 and the lower runs of the belts passing below it. Drums 135 are fixed on a rotatable shaft 137. Shaft 137 has gears 138 fixed thereon which mesh with toothed segment gears 139. By swinging segment gears 139 clockwise from the position shown in Fig. 9 to that shown in Fig. 13, shaft 137 will be turned counterclockwise as viewed in Figs. 9, 11 and 12 and belt 132 will be moved to run fingers 130 and the hooks 128 fixed thereon toward the needle rows to the position shown in Fig. 13. As soon then as enough courses have been knitted so that the first course has been drawn by the welt hooks 102 forward of the position of the hooks 128 in Fig. 13, a welt rod or wire is placed on top of each fabric.

Figure 13:
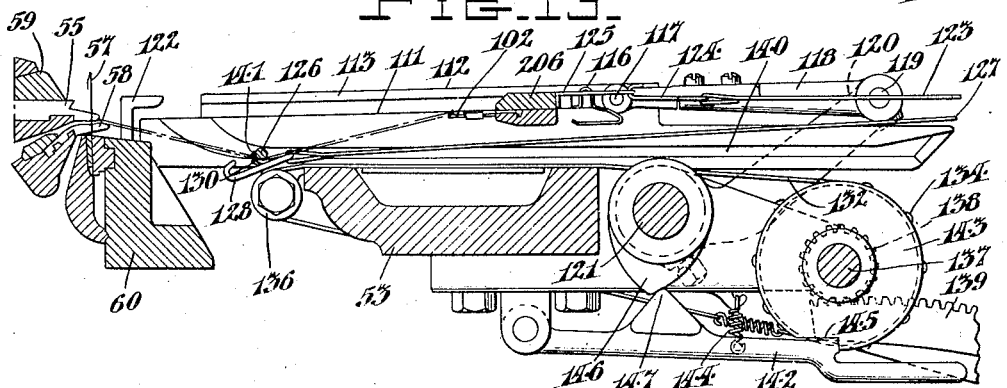

Preferably, as shown in Figs. 9 to 16 inclusive, rails 112 have grooves 140 in their sides for receiving the ends of welt rods 126. Grooves 140 are shown as lying close to the lower edges of rails 112 throughout most of the lengths of the rails but as curving upward to the top faces of the shoulders 111 at points near the stops 122 where the grooves 140 are flared to facilitate introduction of rods 126. In the arrangement shown, a spring stop 141 is fixed to the bottom of each rail 112 and projects up into the groove 140. Stops 141 are adapted to yield as rods 126 are pushed down into the flaring mouths of the grooves to let the rods pass in the draw-off or forward direction, but are adapted to check any movements of the rods in the opposite directions when the rods have once passed the stops. The rods 126 are drawn against stops 141 by the operative to place them in position suitable to be engaged by the hooks 128. The rods 126 and hooks 128 are now in the positions shown in Fig. 13, hooks 128 being held against the tension applied by straps 127 by fingers 130. The belts 132 are held in turn against the tension by latch levers 142 which are urged against the surfaces of drums 143 on shaft 137 by springs 144 so as to engage notches 145 in the surfaces of the drums, as shown in Fig. 13 when hooks 128 are in the position shown in this figure.

When sufficient welt fabric has been knitted to render it convenient to fold the welt rods into the welts or the welt bars 206 approach the pins 117, shaft 121 is turned counterclockwise to carry the welt bars 206 part way toward the needle bars to the position shown in Fig. 14 in which position the shaft 121 and the bars 206 are held stationary for a further period in which welt courses are formed. Further, advantage preferably is taken of the rotation of shaft 121 in turning from the position of Fig. 13 to that of Fig. 14 to automatically throw the tension onto the welt rods. For this purpose, shaft 121 has cams 146 fixed thereon and latch levers 142 have cooperating wedge shaped cam pieces 147 thereon. The cams 146 and 147 are so related that cam 146 is at the left of and in contact with cam 147 when viewed as in Fig. 13. Therefore, as shaft 121 turns from the position of Fig. 13 to that of Fig. 14, cams 146 push cams 147 and arms 142 downward so as to release the drums 143 from latch levers 142. Belts 132, fingers 130 and hooks 128 are thereby rendered free to move and are then drawn forwardly so that hooks 128 automatically engage the ends of welt rods 126. The rods are then drawn against the welts to fold the rods into the welts. Additional courses of welt fabric are then knitted to complete the welts while the parts 206, 118, 120 and 121 remain in the position shown in Fig. 14. Automatic latch means are provided for holding the parts 206, 118, 120 and 121 in the position shown in Fig. 14 which will be presently described. By so throwing the draw-off tension on the welt rods before the welts have been completed and holding the welt rods stationary in an intermediate position, the length of the welts is not limited by the length of path provided for a welt bar on the rails 112 by the mechanism for moving the welt bars toward the needles.

After all the courses for the welts have been completed, the shaft 121 is again moved counterclockwise to bring the welt hooks 102 and 102A with loops of the first course thereon back to their extreme rearward position as shown in Fig. 15 for the purpose of restoring the first course to the needles. After the restoration of the first course to the needles, knitting continues and the welt bars 206 are carried along on the fabric as indicated in Fig. 16 until it is convenient for the operatives to unhook them from the loops and place the welt bars again in the position shown in Figs. 1, 8 and 9 to be ready for another hooking-up operation.

The means, whereby the welt manipulating implements such as hook members 102 and 102A on welt bars 206 are first moved between the needles for hooking-up, then moved part way to the needles and held there for a time, and finally moved between the needles again for restoring the first course to the needles, is described in detail in my said application Serial No. 397,452, but will now be described herein for purposes of convenience.

On main cam shaft 63 is a group of three cams 148, 149 and 150 and a round cam disk 151. The cam follower 152 for cooperating with the group of cams 148, 149 and 150 is mounted to revolve on a bolt 153 fixed at the forward end of a lever 154 and on which follower 152 is adapted to shift parallel to shaft 63. Lever 154 is pivoted at 155 on a bracket 156 fixed to the back beam 52. Except when the welt bars 206 are to be moved, the follower 152 lies in the plane of disk 151 and the weight of the lever 154 and attached parts is taken by an arm 157 which is fixed to extend forwardly from the bracket 156, a stud 158 extending from the lower edge of lever 154 to contact with arm 157 for this purpose. If stud 158 accidentally works out of adjusted position, the weight of lever 154 is transferred by follower 152 to disk 151. When welt bars 206 are to be thrust toward the needles by pins 117 to hook-up the first course, follower 152 is shifted automatically into the plane of cam 148. The means for so shifting follower 152 comprises a link 159 which is operated at the desired times and the necessary amount by a shift means controlled from the usual pattern chain of the machine. When link 159 is operated (pulled downward in the arrangement shown), a lever (not shown) shifts the follower 152 a distance proportional to the movement of link 159. When follower 152 has been shifted to lie in the plane of cam 148, the cam lifts bolt 153 and with it an adjustable extension 160 held rigid with lever 154 thereby lifting also a pivot 161 at the upper end of extension 160 on which is pivoted the lower end of a link 162 the upper end of which is pivoted to the lower end of a toothed rack 163 meshing with a gear 164 fixed to said shaft 121. Therefore, as pivot 153 is raised, rack 163 is also raised from the position shown in Fig. 1 to turn shaft 121 counterclockwise from the position of Figs. 1, 8 and 9 to that of Fig. 11, while the first course is being hooked up. As the high point of cam 148 first passes from beneath follower 152, the follower 152 and rack 163 are lowered again to the position shown in Fig. 1 and the pins 117 thereby brought back to their forward position as shown in Fig. 12 leaving the welt bars 206, however, near the needles.

When it is now time to throw welt bars 206 into the intermediate position shown in Fig. 14, the pattern chain causes cam follower 152 to be shifted to a position in the plane of cam 149, which is not as high as cam 148. Again the shaft 121 is turned counterclockwise but not so far as before. As it is desired that the parts should remain in the position shown in Fig. 14 for a number of revolutions, means is provided to latch the lever 154 in position to hold the parts in the position shown in the figure until released. Such means comprises a bell lever 165, shown partly in dotted lines in Fig. 1 and pivoted to lever 154 at 166. One arm 167 of lever 165 is shown in vertical position in Fig. 1 and has a slight projection 168 having a flat vertical face shown as lying in contact with a flat vertical face at the right hand end of arm 157. Lever 165 is biased to press somewhat against the end of arm 157 by the fact that its horizontal arm 169 (shown in dotted lines in Fig. 1) has a pin and slot connection 170 with the left end of a lever 171 (also shown dotted) which is pivoted at 172 on lever 154. Lever 171 is longer from pivot 172 to its left end than it is from pivot 172 to its right end so that it tends to turn counterclockwise about its pivot 172 as viewed in Fig. 1. Owing to the pin and slot connection between the left end of lever 171 and the right end of arm 169 of lever 165, the counterclockwise bias of lever 171 gives lever 165 the clockwise bias previously mentioned, so that when follower 152 and lever 154 are lifted by cam 149, projection 168 on arm 167 of lever 165 swings above a corner 173 at the upper edge of the right hand end of arm 157 and catches on corner 173 when lever 154 tends to descend again after cam 149 rides out from under cam follower 152. The lever 165 therefore latches lever 154 in the up position after the operation of the lever by cam 149 and the rack 163 therefore holds the shaft 121 in the position shown in Fig. 14 until lever 154 is operated again.

After the welt courses have all been knitted and it becomes necessary to restore the first courses to the needles, the pattern chain causes follower 152 to be shifted into the plane of cam 150. Cams 148 and 150 are of the same maximum height, cam 149 having a lesser maximum height, but cam 150 maintains its maximum height thruout a greater angle than does cam 148, thereby maintaining the pins 117 in their extreme rearward position for a longer time than is provided by cam 148. This is done because more time is required for restoring the first course to the needles than for only hooking up the first course. Cam follower 152 having been shifted into the plane of cam 150, rack 163 turns shaft 121 to move the welt bars from the position shown in Fig. 14 to that shown in Fig. 15 in which the welt bars 206 are again in contact with stops 122. The first courses having been restored to the needles by the method and the welt bar means, to be presently set out in detail, the lever 154 is lowered again to the position shown in Fig. 1 and the rack 163 restores the pins 117, links 118 and levers 120 to the positions shown in Fig. 16. In order that this may occur, however, the bell lever 165 must be unlatched from the corner 173.

To this end, there is provided a link 174 (Fig. 1) which is shown as being generally vertical and pivoted at its upper end at 175 to a part connected to the machine frame and at its lower end is provided with a generally vertical slot 176. A pin 177 fixed to the right hand end of lever 171 extends into slot 176 and is adapted to move up and down therein, the path of pin 177 being limited at the upper and lower ends of slot 176 by adjustable stop screws 178. When lever 154 is lifted by cam 150 at the end of the period during which the lever is held in intermediate position by the engagement of lever 165 with arm 157, cam 150 carries lever 154 high enough so that pin 177 strikes the upper stop screw 178 and turns lever 171 clockwise about its pivot 172 as viewed in Fig. 1, thereby turning bell lever 165 counterclockwise and swinging projection 168 away from corner 173. When now cam follower 152 runs off the high section of cam 150, the lever 154 drops rapidly enough to carry the projection 168 below the level of corner 173 before the projection can catch on the corner. The parts therefore settle back into the positions shown in Fig. 1 so that the latch means is ready to support the weight of lever 154 and parts attached thereto as soon as cam 149 has again raised lever 154 to the height at which the latch lever 165 is free to catch on corner 173. In case the parts tend to hang in the position in which arm 167 of lever 165 is cocked away from fixed arm 157, the stop screw 178 at the bottom of slot 176 strikes the pin 177 to turn lever 165 clockwise to cause its projection 168 to rest against arm 157. It is clear that as cam 148 has the same maximum height as cam 150 the action of the latch means will be the same when lever 154 is operated by cam 148 as when lever 154 is operated by cam 150 and the welt bars 206 will be held in intermediate position only when the lever 154 is operated by a cam such as cam 149 which is of intermediate height.

As is clear from Figs. 27 and 28, when once alternate loops of the first course have been cast off, the hooks 102 draw the cast-off loops ahead of the others in the direction forwardly away from the needles. Similarly, when the welt bars 206 are thrust toward the needle rows by cams 150, the hooks 102 and 102A again maintain the loops of the first course in advance of the others in the direction of motion of bars 206 as is clear from Fig. 31. In order that the bars 206 may transmit a thrust to the loops in the direction toward the needles, hooks 102 and 102A have associated therewith means for engaging loops on the hooks to push them toward the needles. For this purpose, there are provided on or as part of hooks 102 and 102A a means the preferred form of which is shown in Figs. 29 to 36 inclusive. Said means comprises in its preferred form pusher elements composed of thin metal blanks 180 bent around the stems 181 and 181A of hooks 102 and 102A. For reasons which will presently appear, said pusher elements also act as presser members for pressing alternate needles. One of said blanks 180 is shown before bending in Fig. 39. Each blank 180 is shown as having a small hole 182 therein, as shown in Figs. 39 and 40, and each stem 181 and 181A has pressed up thereon a small short pin, the pin 183 on one stem facing the pin 183a on the adjacent stem as shown clearly in Figs. 35 and 36. In other words, the pins on the stems 181 and 181A arranged alternately rights and lefts. The blanks 180 each have a projection 184 at one end which is not only reduced in width as compared to the body of the blank but has a bevelled end as shown at 185. The width of the extensions 184 is preferably somewhat greater than that of the stems 181 of hooks 102 and 102A. In assembling the blanks 180 on the stems 181 and 181A, the pins 183 and 183a are passed thru holes 182 and the edges of the blank then folded over the stems to meet on the opposite sides of the stems from the pins 183 and 183a, as shown in Figs. 37 and 38, to form the right and left pusher and presser elements 179 and 179A on the stems. In other words, the blanks 180 are assembled on stems 181 alternately rights and lefts so that the projections 184 lie against adjacent sides of adjacent stems as appears in Figs. 31, 35 and 36, the positions of pusher and presser elements 179 and 179A longitudinally of stems 181 and 181A being determined by the positions of the pins 183 and 183a on stems 162 and of the holes 182 in the blanks.

As the cast-off loops of the first course embrace the hooks 102 in pairs as is clear from Figs. 28 and 31, the draw-off tension pulls the loops against the parts of the presser elements 179 and 179A closest to the needles, these being the projections 184. Making the parts 184 wider than the stems 181 and bevelling the ends of the projections 184 provides corners 186 which project above the stems 181 and 181A and determine a line transversely of the hooks 102 and 102A on which the loops are held, the loops passing from above the hooks 102 and 102A to the fabric which lies below them and the draw-off tension acting to draw the loops down against corners 186, an action facilitated by the bevel 185. The portions of the loops on the tops of hooks 102 and 102A are therefore held in very exact relation to the needles onto which they are to be placed. Further, as appears clearly in Fig. 31, the thickness of the blanks 179 and 179A is approximately one half the distance between stems 181 of adjacent hooks 102 and 102A so that the corners 186 of adjacent right and left presser elements 179 and 179A are not only in transverse alinement but substantially abut each other to form presser edges between the pairs of hooks adapted to contact alternate needles whenever the hooks 102 and 102A are pushed rearwardly far enough to permit the first course to be returned to the needles, a position shown in Figs. 15 and 29 to 32 inclusive. In this position, the projections 184 of each pair of right and left presser elements 179 and 179A contact and press rearwardly the needles on which loops were knitted in the first course as such needles rise from the position shown in Fig. 29 so that such needles are pressed out of the plane in which they would normally lie. As the presser elements 179 and 179A are at the level of the hooks 102 and 102A, the pressure for pressing alternate needles is exerted at as high a level as practical thereby keeping the pressure required for a given deflection at a minimum. As, however, each of projections 184 is on one side only of a hook 102 and 102A and the projections lie one against another when in assembled position, the presser elements 179 and 179A provide spaces or recesses 187 of a length equal to that of projections 184 adapted to receive alternate needles, the ones which are not contacted by corners 186 and which are not pressed out of their normal planes. Alternate needles are therefore free to rise from the position of Fig. 29 through the loops on the hooks as shown in Figs. 30, 31, 32 and 33. By associating presser means for the alternate needles with the hooks 102 and 102A, not only is the pressure against the needles for a given deflection kept at a minimum but the number of operating parts of the machine is kept at a minimum. Further, as the blanks 180 either contact each other or substantially fill the spaces between hooks 102 and 102A, the hooks can not move materially out of their original vertical planes without causing contact between members 180. Consequently, a group of hooks 102 and 102A having blanks such as 180 arranged thereon as above described and arranged on a given welt bar 206 form a substantially rigid structure so that bending and breakage of hooks 102 and 102A is substantially eliminated as well as breakage of needles by contact of needles with hooks, at least insofar as such contact is due to displacement of hooks from their original positions.

However, as appears in Figs. 19, 20 and 30, the distance to which hooks 102 and 102A can move to the rear of the needles is limited by the presser edge 75 of sinker head 59. In the ordinary knitting cycle, the needles are not tilted forwardly as far as shown in Figs. 29, 30, 31 and 32 and therefore would not rise in recesses 187 so as to properly engage the previously cast-off loops. Therefore, according to the present invention, a special presser cam 188 is provided, shown in Fig. 3 alongside presser cam 76 for the knitting cycle. Cam 188 will be understood to be shown somewhat diagrammatically. Whenever loops of the first course are to be restored to the needles, the cam follower 73 is shifted so as to lie in the plane of cam 188. To this end, cam follower 73 is shiftable on its shaft 189 at right angles to its plane of revolution and a fork 190 is provided which embraces the edge of the follower 73 and shifts the follower when fork 190 is shifted by a rod 191 which is moved as determined by the pattern chain of the machine. Cam 188 is provided with a low spot which causes the needles to be tilted the unusual amount needed to bring them into the position shown in Figs. 29, 30, 31 and 32 and holds them in such position until they have been raised through the previously cast-off loops held on hooks 102 and 102A as shown in Figs. 30, 31, 32 and 33. Further, contrary to what appears at first to be the case, by giving the needles an additional tilt forwardly at the time they are to rise thru the loops, the deflection of the pressed needles need not be so great with consequent decrease in the pressure needed to be applied to them. Cam 150 having passed from beneath follower 152, hooks 102 and 102A are drawn forward by straps 123 connected to bars 206 so that they catch on the fabric as shown in Fig. 33.

The construction and operation of the combined welt hooks and needle presser elements as hereinbefore set forth provides for a more accurate engagement of first course of loops of the welt fabric by the welt hooks and a more accurate and efficient cooperation between the needles and welt hooks in returning the loops on the welt hooks back to the needles as well as carrying out the objects stated hereinabove.

While it is preferred that the loop-pushing and needle pressing means be initially formed largely separately from the welt hooks and afterward applied thereto, the invention is not limited to this. In Figs. 41 to 47 inclusive, two other arrangements within the invention are shown. In Figs. 41 to 44 inclusive, welt hooks 192 and 192A are shown, the stem portions of which are bent sharply to one side of the general center lines of the hooks as viewed in plan first to one side of the center line and then to the other, thereby giving the hooks a zig-zag appearance in plan. As appears in Figs. 42 and 43, hooks 192 are left handed compared to hooks 192A so that the right angled shoulder 193 and corner 194 at the outer end thereof on hook 192 projects in the opposite direction from the similar shoulder 193a and similar corner 194a on hook 192A. Also, the corner 195 on hook 192 points in the opposite direction from the corner 195a on the hook 192A. Therefore, when hooks 192 and 192A are assembled side by side in a welt bar, the corners 194 contact the corners 194a and the shoulders 193 form with shoulders 193a straight presser edge sections transverse to the length of the hooks adapted to contact alternate needles, those from which the loops of the first course were knitted off and not cast off, to press such needles in the rearward direction as shown in Fig. 44; that is, in the direction opposite to the draw-off. Also, the loops of the first course which were cast off of the needles, and therefore retained on a pair of welt hooks 192 and 192A, catch on shoulders 193 and 193a as shown in Fig. 44 to hold the loops against the draw-off tension. Further, corners 195 meet and contact with corners 195a to maintain hooks 192 and 192A the proper distances apart and to provide recesses 196 within which the needles from which loops of the first course were cast off may rise so that the loops may be restored thereto. Further, due to the slight clearance, if any, between corners 194 and 194a on the one hand and corners 195 and 195a on the other, the set of hooks 192 and 192A is also substantially rigid against lateral pressure, thereby preventing breakage of hooks and also maintaining them in their original positions as installed to prevent them from contacting and thereby bending or breaking any of the needles. The corners 194 and 194a and the shoulders 193 and 193a incline forwardly and downwardly, as generally indicated in Fig. 41, to increase the efficiency of the draw-off tension in drawing the loops down on hooks 192 and 192A and against shoulders 193 and 193a.

The third form of combined hook and presser means within the present invention is shown in Figs. 45 to 47 inclusive. In Figs. 45 to 47 inclusive, welt hook members 197 and 197a are connected two together as best shown in Fig. 46, the stems 198 and 198a respectively of two connected hook members being fastened on opposite sides of a central stem 199 fixed to a relatively heavy shank 200 by which two hook members 197 and 197a may be assembled in a welt bar. The stems 199 are shown as riveted to stems 198 and 198a but the method of attachment is immaterial to the invention. Stems 199 are just a bit wider vertically than stems 198 and 198a and the free ends of stems 199 are shown as inclined downwardly and forwardly. The corners 201 at the upper rear ends of stems 199, therefore, act as presser edges for alternate needles to press them on the sides opposite to the needle beards and also to catch the cast off loops as the hook members 197 and 197a are pushed toward the needle rows, while the inclined faces 202 facilitate the action of the draw-off tension in pulling the portions of the loops on top of the hook members down against the corners 201. There being only one shank 200 and stem 199 to two hook members 197 and 197a, each space 203 between hook members 197 and 197a on adjacent shanks 200 is free to permit alternate needles to rise in position to engage the loops on the hooks.

The method of operation in accordance with the present invention will be obvious to those skilled in the art from the foregoing description. For purposes of convenience, it will, however, be recapitulated as follows:

It will be seen that all three forms of welt hook members or loop manipulating implements 102, 192 and 197, each made lefts and rights, have their loop engaging ends or hooks proper each bent in a single plane which includes also the central longitudinal axis of the welt hook member.

After yarn has been laid to the needles of a full-fashioned knitting machine for forming the first course of a welt and sunk and divided by the sinkers and dividers so as to be formed into loops around the stems of the needles, welt hooks having loop pusher and needle presser means associated therewith are thrust one intermediate each two needles in the horizontal direction and between a sinker or divider and a knockover bit in the vertical direction. The loops are then drawn down by the needles off the sinkers and dividers and onto the stems of the hooks. Draw-off tension is then applied to the loops through the hooks to engage the loops firmly with the hooks and then the tension is relaxed while alternate loops are cast off the needles. The draw-off tension having been reapplied, the hooks hold the loops which have been cast-off and knitting is then proceeded with, the hooks drawing the cast-off loops ahead of the knitted loops of the first course. After a certain number of courses have been knitted, the welt is turned by a procedure which may be in large measure of known character. A suitable procedure may include steps by which a welt rod is pressed onto the welt fabric, the welt hooks are moved part way toward the needles and draw-off tension applied to the welt rod to form a fold in and to tension the welt fabric, the loop pusher means on said hooks thrusting the previously cast-off loops toward the needles ahead of the knitted loops of the first course when the hooks are moved toward the needles. If the total number of courses for the welt has been knitted before the welt hooks start their second movement toward the needles, the hooks need not pause at a point part way toward the needles for applying the welt rod to the fabric and the tension to the welt rod. If desired, however, the hooks may be stopped long enough in an intermediate position before reaching the needles on their second movement toward the needles during the knitting of a given welt for certain courses to be knitted while the hooks are held in such intermediate position, but the invention is not limited to so doing. At the time the welt hooks are thrust a second time during the knitting of a given set of welt courses between the planes in which the needles operate, either after a preliminary stop or not, the needles are at the lower ends of their paths. Since, in accordance with the present invention, said hooks have combined therewith loop pushing and needle pressing means, the loop pushing means are active in pushing the cast-off loops of the first course toward the needle row all during the second rearward movement of the hooks and hold such loops in such position that they may receive needles on the upstroke thereof while, near the end of said second rearward movement, the needle pressing means contacts alternate needles, those which knitted in the first course and which lie between the ones from which loops were cast off, so as to press them in the direction opposite the draw off. The needles which knitted loops in the first course of the welt therefore are kept out of the way of the yarn of the first course. Said loop pushing and needle pressing means are, however, provided only between pairs of needles or, in other words, in alternate spaces between needles so that there is room between the hooks of a given pair to receive alternate needles, those from which loops were cast off, which remain unpressed and in their normal positions relative to their needle bars. Also, the needle bar is tilted enough to ensure that the unpressed needles will thread through said spaces and therefore through the loops held on the hooks in contact with the loop pushing and needle pressing means. Therefore, the needles from which the loops of the first course were cast off knit the cast off loops to the course at the lower edge of the welt to complete the turning of the welt.

The improvements specifically shown and described by which the above results are obtained can be changed and modified in various ways without departing from the invention herein disclosed and hereinafter claimed.

I claim:

1. A method of hooking up the first course of and turning a flat knitted welt comprising advancing a group of welt hooks between the needles to receive loops of the first course thereon, casting off the loops of the first course from alternate needles, utilizing the remaining needles for knitting the first course, knitting a number of subsequent courses and drawing them off by tension applied to said hooks, thrusting said hooks toward the needles again having said cast-off loops of the first course stretched each on two hooks, holding said loops toward the needles by means associated with said hooks in position to contact the sides of said stretched loops and simultaneously contacting by said means the needles utilized in knitting the loops of the first course to press them away from their normal position, and bringing the unpressed needles up through the loops on the hooks.

2. In a method of hooking up a first course of a welt, knitting the welt and afterward restoring said first course to the needles, the steps of casting off alternate loops of the first course from the needle row, receiving said cast-off loops on the hook portions of combined welt hook and presser members, drawing off the fabric by said hook portions while knitting a portion of the welt, reversing the movement of said members and engaging said cast-off loops by the presser portions of said members while knitting the remaining portion of said welt, bringing alternate needles up through said cast off loops and pressing the remaining needles by the presser portions of said members in the direction opposite the draw-off to prevent them from affecting the loops.

3. A method of hooking up the first course of and turning a flat knitted welt comprising advancing a group of combined welt hook and presser members between the needles to engage the loops of the first course thereby, casting off the loops of the first course from alternate needles and receiving said cast-off loops on pairs of said members, utilizing the remaining needles for knitting the first course, knitting a number of subsequent courses and drawing them off by tension applied to said members while engaged by the hook portions of the members, thrusting said members toward the needles again having said cast off loops of the first course each in contact with the presser portions of two of said members, pressing the needles utilized in knitting the loops of the first course by said presser portions to press such needles away from their normal position, and bringing the unpressed needles up through the loops on said members.

4. A method of hooking up a first course of and turning a knitted welt comprising the steps of advancing between the needles the hook portions of a group of members having hook and shoulder portions to engage the loops of the first course by said hook portions, casting off the loops of the first course from alternate needles, utilizing the remaining needles for knitting the first course, knitting a number of subsequent courses and drawing them off by tension applied to said members, thrusting said members toward the needles again having said cast-off loops of the first course stretched each on two members and in contact with the shoulder portions of said members, and pressing by said shoulder portions the needles utilized in knitting the loops of the first course to force them away from their normal position while bringing the unpressed needles up through the loops of said members.

5. The method of knitting and turning welts comprising engaging welt hooks with the sinker loops of the first course of a welt while on the needles, casting off alternate loops from the needles before knitting any loops of the first course and receiving said cast-off loops on alternate pairs of said hooks, knitting the welt, thrusting the welt hooks toward the needles while having the said cast-off loops thereon, applying a draw-off tension to the welt, rocking the needles in the direction of the draw-off, pressing alternate needles in the direction contrary to the draw-off by means associated with the welt hooks and substantially at the level of the hooks, and bringing the non-pressed needles up through said cast-off loops on the hooks to transfer the loops back to the needles.

6. In a full-fashioned or flat knitting machine the combination of knitting mechanism, means for laying yarn thereto, and means for hooking up the loops of the first course of a fabric held on said needles and for restoring said first course to the needles after a portion of fabric has been knitted including a set of hook members having projections on their sides arranged alternately rights and lefts and a right close to a left to form combined presser and yarn holding faces between pairs of hooks.

7. A welt bar having a set of welt hooks supported therefrom and presser elements between pairs of said hooks contacting loops stretched each across one of said pairs of hooks and contacting needles intermediate said pairs to force such intermediate needles out of their normal positions for preventing them from acting on the loops.

8. A welt bar having a set of welt hooks thereon, members on said hooks projecting farther from the bar on the one sides of the hooks than on the other sides, and said farther projecting portions arranged alternately rights and lefts to provide presser faces between pairs of hooks.

9. A combined welt hook and needle pressing means having a stem and a hook portion and a part fixed to said stem adapted and arranged to engage a loop held in part by the stem and to contact a needle to assist in preventing the needle from acting on a loop.

10. A welt hook having a member thereon placed substantially centrally with respect to the axis of the hook but projecting farther along the hook on one side thereof than on the other to provide a loop pushing shoulder.

11. A combined welt hook and presser means having a stem and a hook portion and a sheet metal member closely surrounding said stem and projecting farther toward the hook portion on one side of the stem than on the other.

12. A combined welt hook and needle pressing means having a stem and a hook portion, a sheet metal member closely surrounding said stem and means on said stem holding said member fixed in position thereon, said member projecting farther toward the hook portion on one side of the stem than on the other.

13. A welt bar having a set of welt hooks equally spaced thereon and provided with stems, laterally projecting shoulders fixed on said stems and projecting two from adjacent hooks so as to substantially fill the spaces between the stems on which they are fixed.

14. A welt bar having a set of welt hooks equally spaced thereon and provided with stems, laterally projecting shoulders fixed on said stems and projecting two from adjacent hooks so as to substantially fill the spaces between the stems on which they are fixed, said shoulders forming loop pushing surfaces between pairs of hooks.

15. A welt bar having a set of welt hooks thereon provided with stems and shoulders on said stems arranged alternately rights and lefts for engaging loops in the functioning of the welt bar in welt turning operations.

16. A welt bar having a set of welt hooks thereon having stems and means associated with said stems and projecting laterally therefrom to substantially fill the spaces between the hooks to render the hooks of the set substantially rigid against lateral pressure.

17. A welt bar having a set of welt hooks thereon provided with stems and shoulders on said stems arranged alternately rights and lefts for engaging loops and contacting alternate needles.

18. A welt bar having a set of welt hooks equally spaced thereon and provided with stems, laterally projecting shoulders fixed on said stems and projecting two from adjacent hooks so as to substantially fill the spaces between the stems on which they are fixed, said shoulders forming loop pushing and needle pressing surfaces between pairs of hooks but providing recesses between the hooks of each pair to receive needles.

19. A welt bar having a set of welt hooks equally spaced thereon and provided with stems, and means fixed to stems of said hooks and projecting laterally therefrom so as to substantially bridge the spaces between pairs of hooks while affording loop pushing and needle pressing surfaces, but the hooks of each pair having recesses therebetween to receive needles.

20. A welt hook having a stem, a hook part at one end of said stem lying in a single plane, and a projection extending from said stem substantially at right angles to said plane.

21. In a flat knitting machine having a needle row, a welt hook having a stem and a loop pushing and needle pressing shoulder projecting laterally from a side of said stem so that said shoulder is generally parallel to the needle row in use.

22. In a full-fashioned knitting machine including a plurality of reciprocating knitting needles, a welt bar movable generally at right angles to said needles and having welt hooks carried thereby, said hooks having combined loop-pushing and needle pressing parts fixed thereto.

23. An implement for manipulating the first courses of flat stocking blanks comprising a loop engaging portion lying in a plane, a stem portion fixed thereto and whose central axis is in said plane, and a shoulder portion fixed to said stem portion having an active face adapted to engage a loop of the fabric and offset from said plane.

24. An implement for manipulating the first courses of flat knit stocking blanks comprising a loop engaging portion lying in a plane, a stem portion fixed thereto and whose central axis is in said plane and a shoulder portion fixed to said stem portion having an active face adapted to engage a loop of the fabric, said shoulder being offset from said plane and sloping away from the loop engaging portion of the implement going in the downward direction when the implement is horizontal and the loop engaging portion is vertically above said axis.

25. A welt hook member having a hook portion lying in a single plane and a stem portion provided with a projection on one side of said plane and another projection at a different position longitudinally of the member and on the opposite side of said plane from said first projection.

26. A welt hook assembly comprising two proper hook parts lying each in a single plane parallel to that of the other hook part and a common stem member to which said hook parts are fastened and forming a shoulder intermediate the planes of said hook parts adapted to press a fabric loop and a needle when the assembly is in use.

27. In a full-fashioned knitting machine, a row of knitting needles, means to move said needles through a knitting cycle, means to draw off fabric knitted by the needles, a presser lever having a cam follower thereon, cams with which said follower cooperates for knitting and for narrowing the fabric, means for pushing a first course toward the needle row to facilitate closing a welt, and a third cam with which said cam follower cooperates when a welt is being closed and which has a low spot giving the needles an unusual degree of movement in the draw-off direction.

28. In a welt bar for use in a flat knitting machine having knitting instrumentalities and means for laying yarn thereto, comprising means for hooking up the loops of the first course of fabric held on said needles and for restoring said first course to the needles after a portion of fabric has been knitted, said welt bar having a plurality of hooks fixed thereto and presser means in position between alternate hooks, said last means providing combined presser and yarn stop faces between pairs of hooks.

29. In a full-fashioned or flat knitting machine, the combination of knitting mechanism, means for laying yarn thereto, and means for hooking up the loops of the first course of fabric held on said needles and for restoring said first course to the needles after a portion of fabric has been knitted including a set of hook members together with projections arranged between alternate hook members to provide combined presser and yarn holding faces between pairs of hooks.

GOTTLOB BITZER.

REFERENCES CITED

The following references are of record in the file of this patent:

UNITED STATES PATENTS

| Number | Name | Date |
|---|---|---|
| 1,891,117 | Stevenson | Dec. 13, 1932 |
| 1,897,917 | Stevenson | Feb. 14, 1933 |
| 2,134,727 | Miller | Nov. 1, 1938 |
| 2,238,192 | Start et al. | Apr. 15, 1941 |
| 2,325,208 | Straussberger | July 27, 1943 |
| 2,217,520 | Miller | Oct. 8, 1940 |
| 1,127,283 | Richter | Feb. 2, 1915 |
| 1,683,698 | Richter | Sept. 11, 1928 |
| 1,770,849 | Hadfield | July 15, 1930 |
| 1,790,350 | Laux | Jan. 27, 1931 |
| 1,826,661 | Haines | Oct. 6, 1931 |
| 1,995,643 | Miller | Mar. 26, 1935 |
| 1,995,644 | Miller | Mar. 26, 1935 |
| 2,326,964 | Nebel | Aug. 17, 1943 |
| 2,190,664 | Howie | Feb. 20, 1940 |
| 2,363,000 | Hoffman et al. | Nov. 21, 1944 |

FOREIGN PATENTS

| Number | Country | Date |
|---|---|---|
| 302,916 | Great Britain | Feb. 20, 1930 |
| 509,962 | Germany | Oct. 15, 1930 |